(No Model.) 6 Sheets—Sheet 1.
J. H. BROWN & H. W. SMITH.
NUT MILLING MACHINE.
No. 525,313. Patented Aug. 28, 1894.
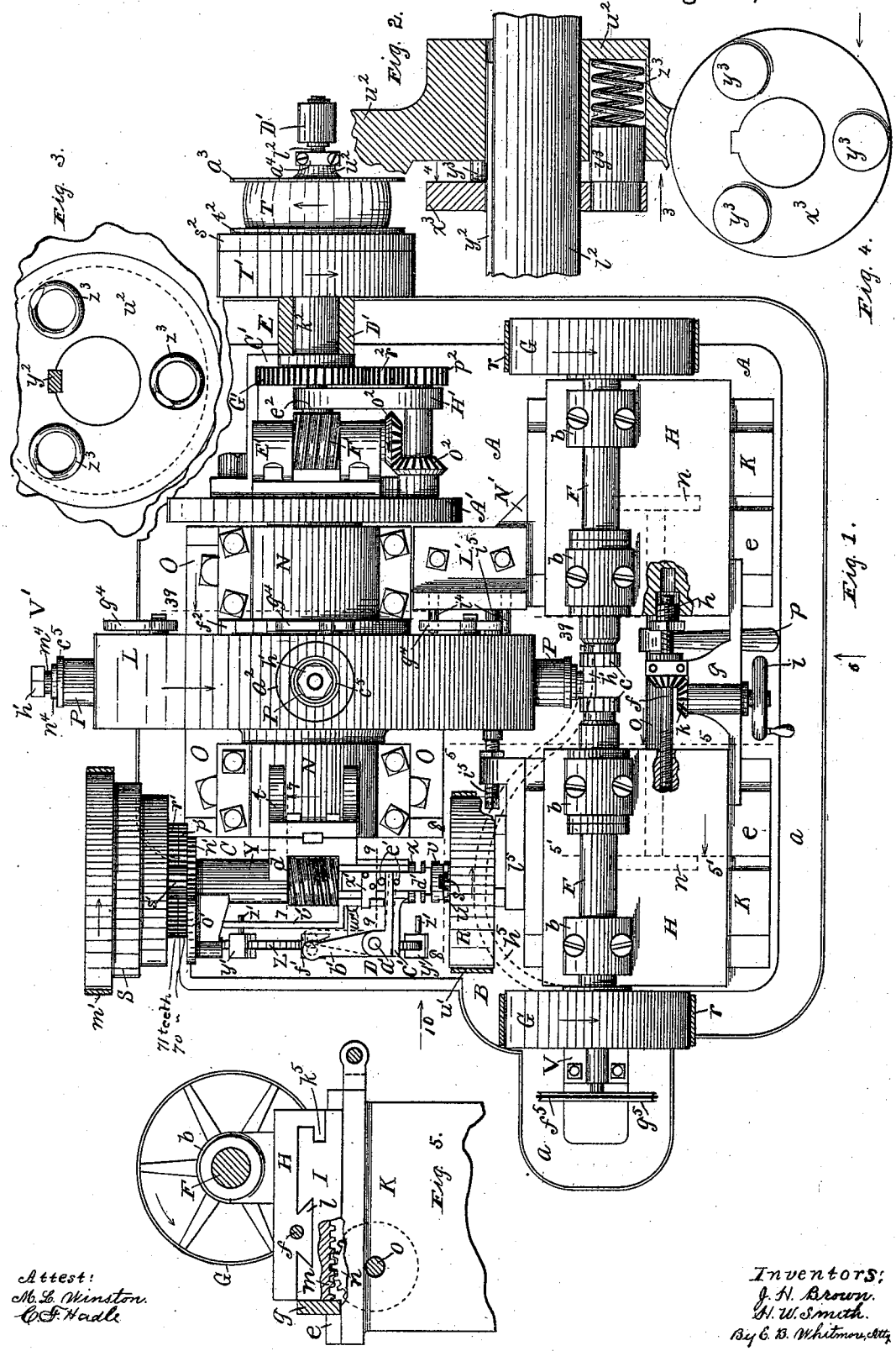

(No Model.) 6 Sheets—Sheet 2.
J. H. BROWN & H. W. SMITH.
NUT MILLING MACHINE.
No. 525,313. Patented Aug. 28, 1894.
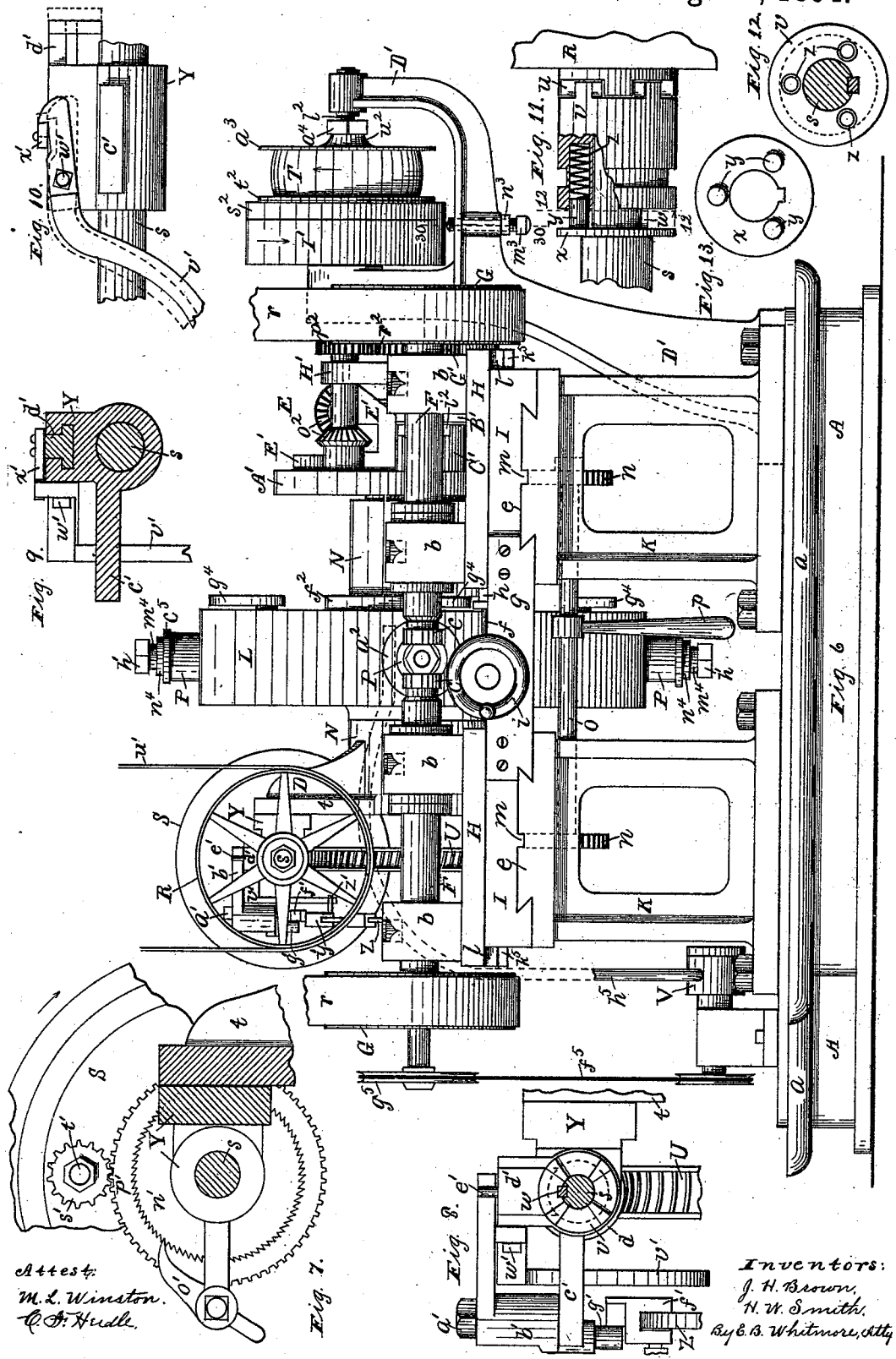
Attest:
M. L. Winston.
C. F. Hudle.
Inventors:
J. H. Brown,
H. W. Smith,
By C. B. Whitmore, Atty
THE NORRIS PETERS CO., PHOTO-LITHO., WASHINGTON, D. C.

(No Model.) 6 Sheets—Sheet 3.
J. H. BROWN & H. W. SMITH.
NUT MILLING MACHINE.
No. 525,313. Patented Aug. 28, 1894.
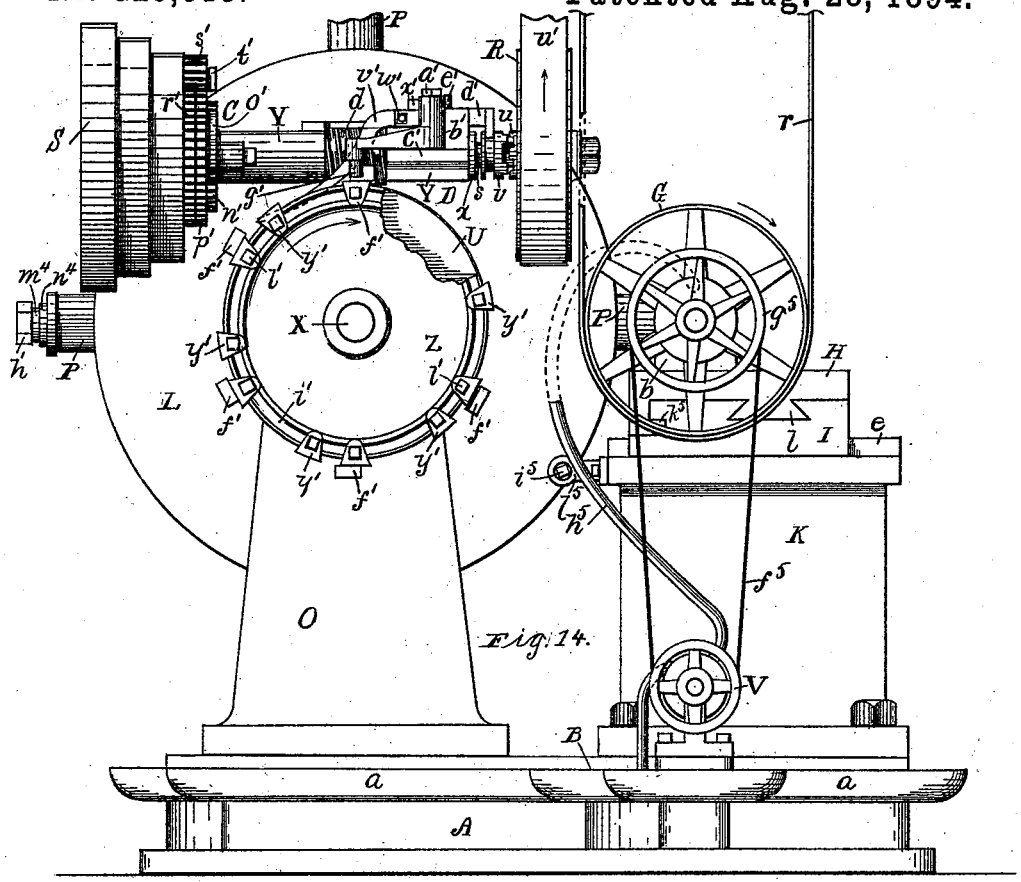
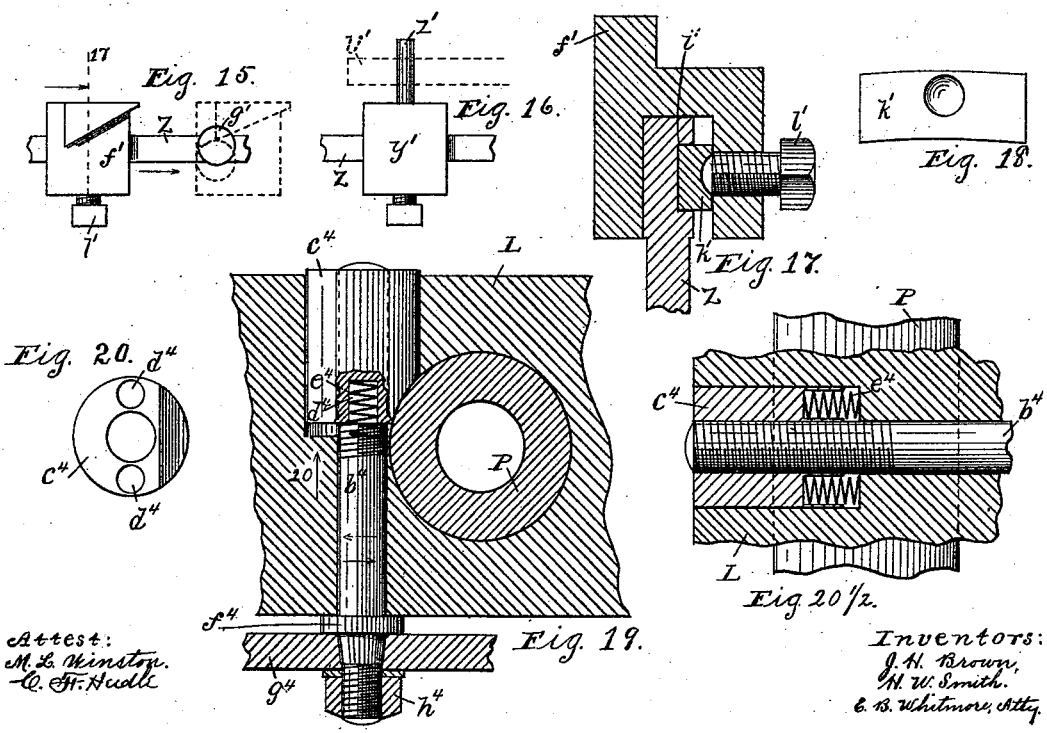

(No Model.) 6 Sheets—Sheet 4.
J. H. BROWN & H. W. SMITH.
NUT MILLING MACHINE.
No. 525,313. Patented Aug. 28, 1894.
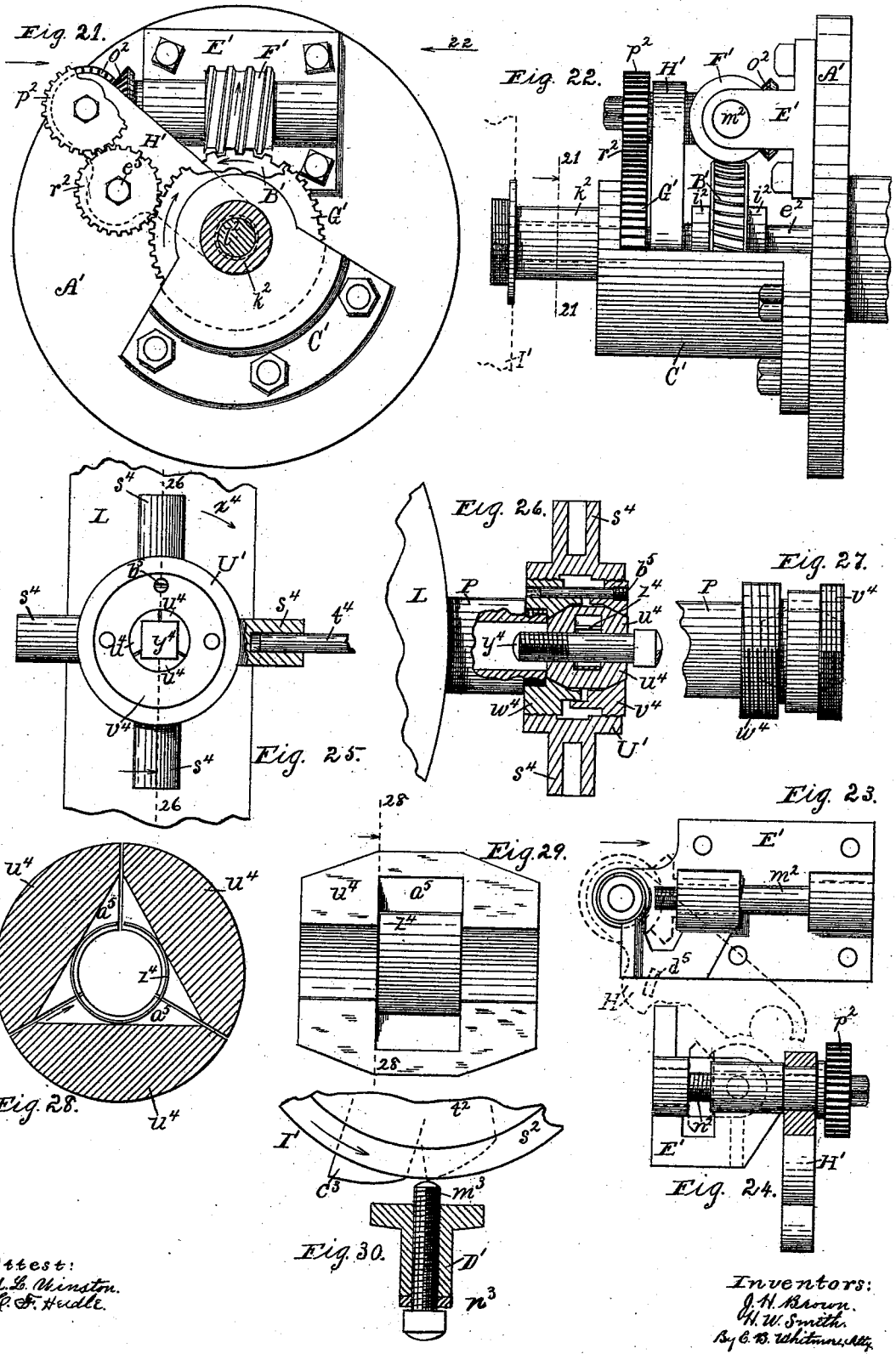

(No Model.)　　　　　　　　　　　　　　　　6 Sheets—Sheet 5.
J. H. BROWN & H. W. SMITH.
NUT MILLING MACHINE.
No. 525,313.　　　　　　　　　Patented Aug. 28, 1894.
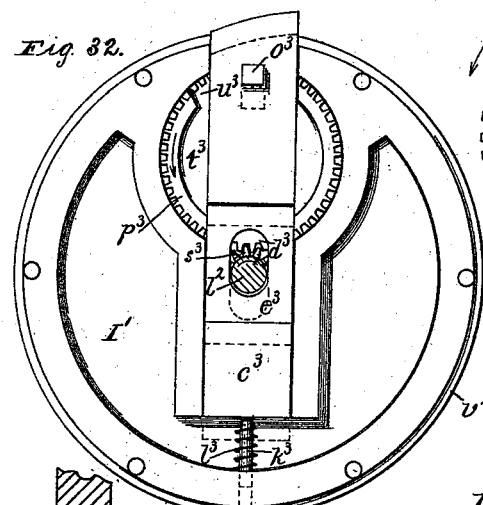
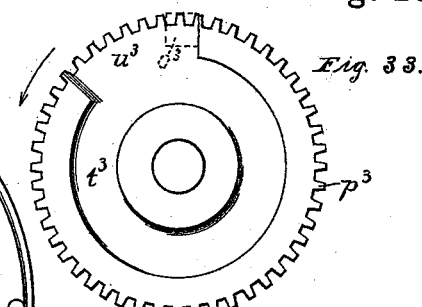
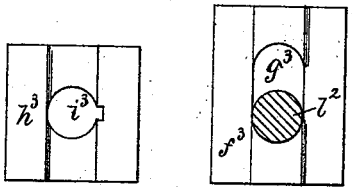
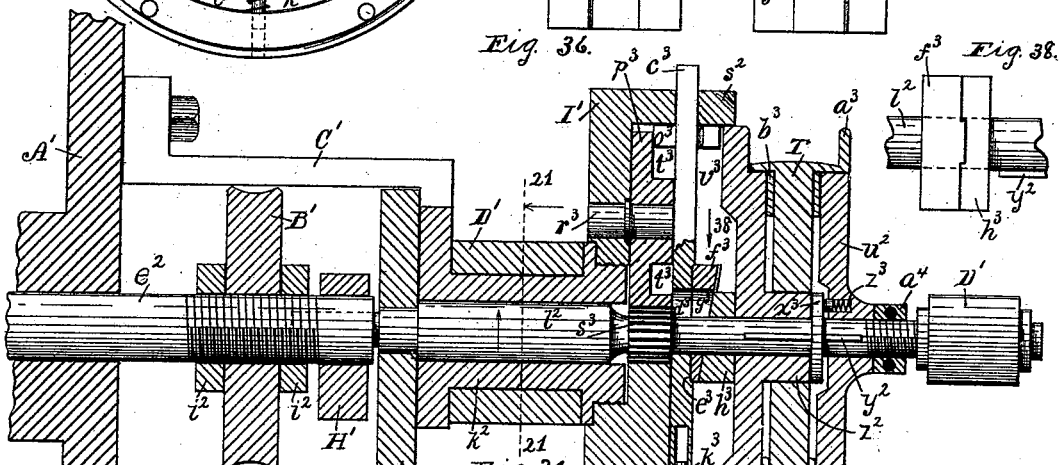
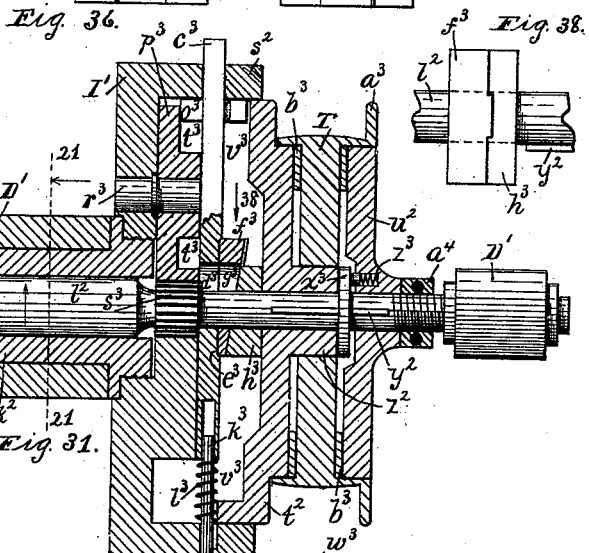
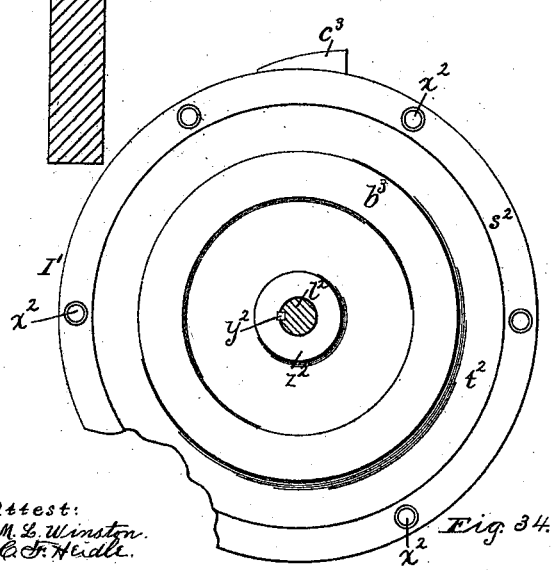
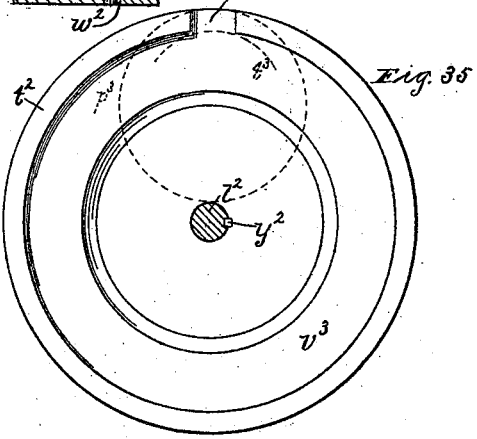
Attest:
M. L. Winston.
C. F. Heidl.
Inventors:
J. H. Brown,
H. W. Smith.
By E. B. Whitmore, Atty.

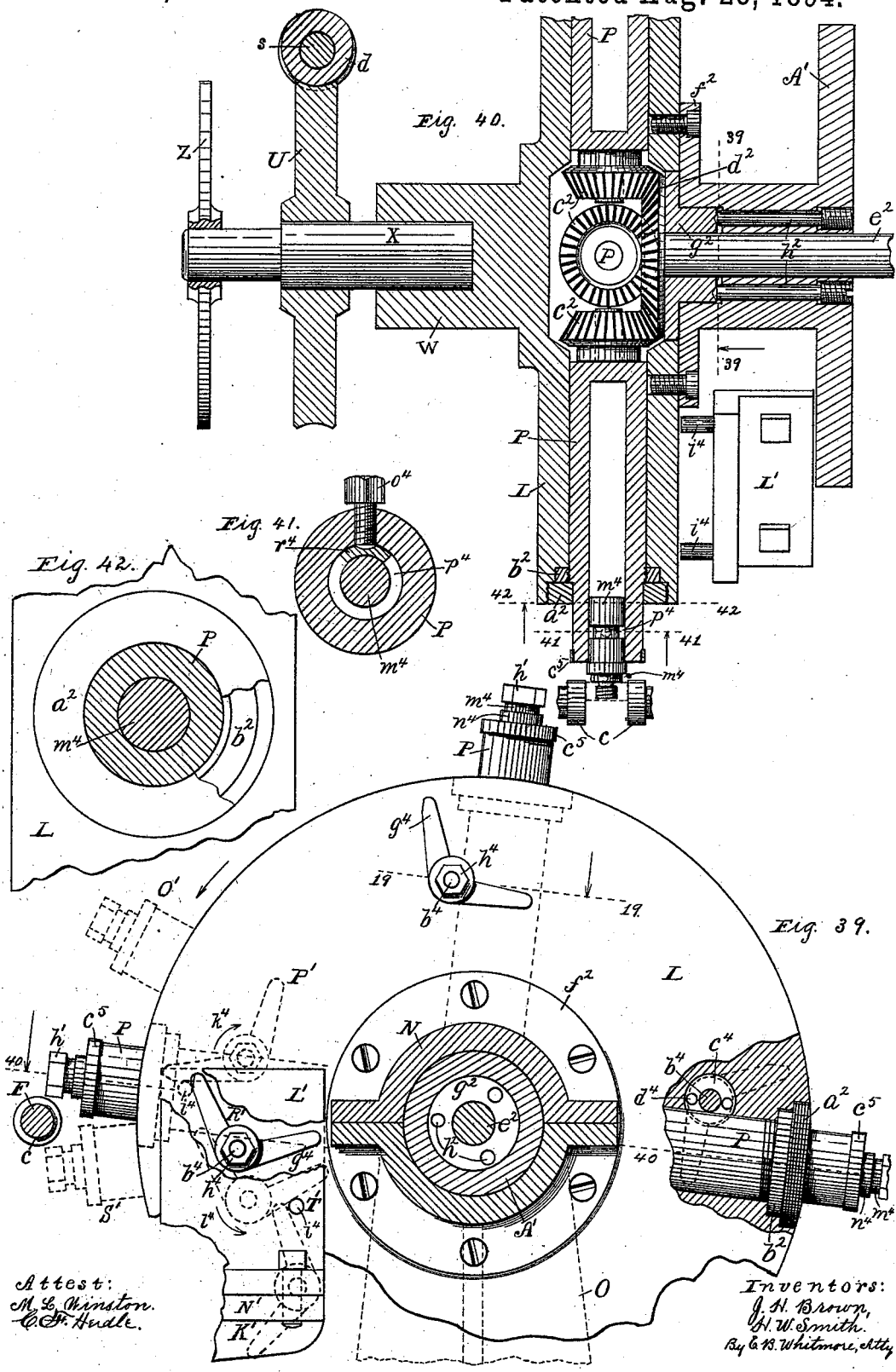

UNITED STATES PATENT OFFICE.

JESSE H. BROWN AND HIRAM W. SMITH, OF ROCHESTER, NEW YORK, ASSIGNORS TO THE ROCHESTER MACHINE SCREW COMPANY, OF SAME PLACE.

NUT-MILLING MACHINE.

SPECIFICATION forming part of Letters Patent No. 525,313, dated August 28, 1894.

Application filed February 23, 1894. Serial No. 501,104. (No model.)

*To all whom it may concern:*

Be it known that we, JESSE H. BROWN and HIRAM W. SMITH, of Rochester, in the county of Monroe and State of New York, have invented a new and useful Improvement in Nut-Milling Machines, which improvement is fully set forth in the following specification and shown in the accompanying drawings.

Screws and bolts having polygonal heads, such as square, hexagonal or other form, when used for finished or finer grades of work are required to have the sides of the heads truly milled. Also threaded nuts for similar work, formed in regular polygons, are milled upon their sides and truly formed and finished.

To produce an automatic machine for doing this work rapidly and accurately is the object of our invention.

In this machine two independent rotary cutters are employed operating simultaneously upon two opposite sides of the bolt head or nut. After two sides of each piece held by the machine are finished the pieces are indexed to bring them into positions to have two other sides milled. A feed mechanism is provided to crowd the work against the cutters; and when one piece has passed the cutters a rapid action of the machine brings another one quickly into position to be milled. The finished bolts and nuts are taken from the machine by an attendant who also supplies others placing them in proper relative positions to be acted upon by the cutters. All of these operations save as to the part performed by the attendant are performed automatically; the machine being hereinafter fully described and more particularly pointed out in the claims.

Referring to the drawings Figure 1 is a plan of the machine parts being broken away and other parts shown in two positions by full and dotted lines. Fig. 2 is a diametrical section of the hub of the outer friction disk and the relief plate. Fig. 3 is a view of the hub of the outer friction disk seen as indicated by arrow 3 in Fig. 2. Fig. 4 is a view of the relief plate seen as indicated by arrow 4 in Fig. 2. Fig. 5 is a vertical cross section on the dotted line 5 5 in Fig. 1, viewed as indicated by the arrow pointed on said dotted line, a part of the slide block being sectioned as on the dotted line 5' in Fig. 1. Fig. 6 is a front elevation of the machine seen as indicated by arrow 6 in Fig. 1, parts being broken away. Fig. 7 is a cross section of the feed shaft and other parts taken on the dotted line 7 7 in Fig. 1, viewed as indicated by the arrow pointed thereon. Fig. 8 is a cross section of the feed shaft on the dotted line 8 8 in Fig. 1, showing the clutch and clutch-operating mechanism. Fig. 9 is a similar section of the feed shaft and associated parts on the dotted line 9 9 in Fig. 1. Fig. 10 is a side elevation of a portion of the feed shaft with some associated parts seen as indicated by arrow 10 in Fig. 1, parts being shown in two positions by full and dotted lines. Fig. 11 is a side elevation of a portion of the feed shaft showing the clutch partly in longitudinal section, the view being taken as indicated by arrow 10 in Fig. 1. Fig. 12 is a cross section of the feed shaft on the dotted line 12 12 in Fig. 11 viewed as indicated by the arrow pointed thereon. Fig. 13 is a plan of the buffer for the clutch seen in a direction opposite to that in which Fig. 12 is seen. Fig. 14 is an end elevation of the machine, seen in the direction indicated by arrow 10 in Fig. 1, parts being broken away and omitted. Fig. 15 is an edge view of a portion of the clutch-operating wheel with a dog attached, parts being shown in two positions by full and dotted lines. Fig. 16 is a similar view of a part of the clutch-operating wheel, showing a different dog for operating the catch lever. Fig. 17 is a cross section of the parts taken on the dotted line 17 in Fig. 15, viewed as indicated by the arrow pointed thereon. Fig. 18 is a plan of a gib. Fig. 19 is a cross section of a spindle, a part of the spindle carrier and other parts, along the axis of the binder, indicated by dotted line 19 19 in Fig. 39, and viewed as indicated by the arrow pointed on the line, a part of the binder head being longitudinally sectioned. Fig. 20 is a view of the binder head seen as indicated by arrow 20 in Fig. 19. Fig. 20½ is a section along the axis of the binder on a plane parallel with the axis of the spindle. Fig. 21 is a cross section of the driving shaft of the indexing mechanism and the carrier for the friction-operating drum taken on the dotted lines 21 21 in Figs. 22 and 31, viewed as indicated by arrows pointed on said lines. Fig. 22 is a side elevation of parts of the indexing mechanism seen as indicated by arrow 22 in Fig. 21. Fig. 23 is a plan of the holder for the worm shaft and other parts of the indexing mechanism. Fig. 24 is a view of said holder seen as indicated by arrow in Fig. 23. Fig. 25 is an edge view of a portion of the spindle carrier showing a holding chuck in place. Fig. 26 is a vertical section of the chuck taken on the dotted line 26 26, in Fig. 25, viewed as indicated by the arrow pointed thereon. Fig. 27 is a side elevation of the jaw holders of the chuck. Fig. 28 is a cross section of the jaws taken on the dotted line 28 28 in Fig. 29, viewed as indicated by the arrow in said latter figure. Fig. 29 is an interior view of a jaw with the expanding spring in place seen as indicated by arrow in Fig. 28. Fig. 30 is a side elevation of a portion of the friction-operating drum and vertical cross section of the supporting standard taken on the dotted line 30 30, Fig. 6, seen as indicated by the arrow pointed on said line. Fig. 31 is a central longitudinal section of the essential parts of the indexing mechanism. Fig. 32 is an interior view of the friction-operating drum, the pressing tongue being shown in two positions by full and dotted lines. Fig. 33 is a plan of the confining gear. Fig. 34 is a side elevation of the inner friction disk and friction-operating drum. Fig. 35 is an interior view of the inner friction disk. Fig. 36 is a plan of the inclined pressing block for the friction. Fig. 37 shows the face of the wedge contiguous with the pressing block. Fig. 38 is an end view of the block and wedge seen as indicated by arrow 38 in Fig. 31. Fig. 39 is a side elevation of the spindle carrier, parts being transversely sectioned on the dotted line 39 39 in Figs. 1 and 40, viewed as indicated by arrow in the latter figure, parts being shown in two positions by full and dotted lines, other parts broken away and a part of the carrier sectioned on the axis of a spindle. Fig. 40 is a diametrical section of the carrier and some associated parts taken on the dotted line 40 40 in Fig. 39 and viewed as indicated by the arrow pointed thereon. Fig. 41 is a transverse section of a spindle and a mandrel taken on the dotted line 41 41 in Fig. 40 and viewed as indicated by arrow. Fig. 42 is a cross section of parts on the dotted line 42 42 in Fig. 40, the view being indicated by arrow, a part of the holding ring for the spindle being broken away. Figs. 2, 3, 4, 17, 18, 28, and 29 are drawn full size. Figs. 11, 12, 13, 15, 16, 19, 20, 33, 36, 37, 38 and 42 are drawn one-half size. Figs. 7 to 10, 25 to 27, 30 to 32, 34 and 35 are drawn one-third size. Figs. 21 to 24 and 39 to 41 are drawn one-fourth size. And Figs. 1, 5, 6 and 14 are drawn one-sixth size.

When the machine is at work the following general operations have to be performed: (first) the cutters continually rotated; (second) the bolt or nut quickly brought into position to be acted upon by the cutters; (third) the bolt or nut fed against the cutters; (fourth) the work indexed.

Five independent driving belts are employed to perform these several operations; namely, two to drive the independent cutters, one to drive the indexing mechanism, one to drive the feed mechanism and one to shift the work.

The feed mechanism is shown at C in the general views given in Figs. 1, 6 and 14, and in detail in Fig. 7, Sheet 2, and Fig. 40, Sheet 6. The mechanism for quickly moving the work forward is shown at D in Figs. 1, 6 and 14 and in detail in Figs. 8 to 13, Sheet 2, Figs. 15 to 18, Sheet 3 and Fig. 40, Sheet 6. The indexing mechanism is shown at E in Figs. 1, 6 and 14 and in detail in Figs. 2 to 4, Sheet 1, Figs. 21 to 24 and Fig. 30, Sheet 4, in the figures in Sheet 5, and Fig. 40, Sheet 6.

Referring to the parts shown A, Figs. 1, 6 and 14, is an iron bed plate or foundation upon which the upper work of the machine rests.

$a$ is a peripheral gutter for conveying oil to a simple reservoir at B, formed in the bed plate.

F F, Figs. 1, 5 and 6, are horizontal cutter shafts substantially in line with each other, G G being belt pulleys for driving them.

H H, Figs. 1, 5, 6 and 14, are horizontal saddles supporting the cutter shafts, adapted to slide in directions toward or from each other.

I I are sliding blocks carrying the saddles and adapted to slide in lines at right angles with the axis of the cutter shaft.

K K are vertical, rigid standards resting upon the base plate, supporting the silding blocks and superincumbent parts.

L, Figs. 1, 13, 14, 39 and 40, is a rotatory spindle carrier turning in horizontal bearings N N, in standards O O, resting upon the bed plate.

P are spindles in the spindle carrier for holding the work. R, Figs. 1, 6 and 14, is a pulley for quickly moving the spindle carrier.

S, Figs. 1, 6, 7 and 14, is a step pulley for driving the feed mechanism.

T, Figs. 1, 6 and 31, is a belt pulley for driving the indexing mechanism.

U, Figs. 6, 14 and 40, is a worm gear for driving the spindle carrier.

V, Figs. 1, 6 and 14, is a rotary pump for pumping oil from the reservoir onto the cutters.

*The cutter operating devices.*—The cutter shafts F F, which carry similar cutters $c\ c$, rest in bearings $b\ b$, Figs. 1, 5 and 6, rising from the saddles H, the axes of the shafts being substantially in line and parallel with the axis of the spindle carrier L and on a level therewith. The saddles are fitted to the sliding blocks I I by means of dove-tail bearings $l\ l$ parallel with the axis of the cutter shafts, shown in Figs. 5 and 14, which admits of the cutters being moved toward or from each other to act upon nuts or bolt heads of different sizes.

The saddles with the cutter shafts are moved toward or from each other by means of a small shaft $f$, Figs. 1 and 5, supported by a holder $g$, Fig. 6, rigid with the sliding blocks I I. This shaft is parallel with the cutter shafts and is threaded at one end directly into a saddle and at the other into a screw plug $h$ threaded in the opposite saddle. The threads at the ends of the shaft are right and left respectively so that a turning of the shaft will cause the saddles and the cutters to simultaneously approach each other or recede as the case may be. And by turning the screw plug the right-hand saddle will be moved independently toward or from the other saddle on account of the threads on the screw plug and the shaft being of different leads.

The spindles P are radial in the spindle carrier and have their axes in a plane at right angles with the axis of the spindle carrier. The opposing cutters $c$ $c$ are held upon each side of said plane and, by means of the differential screw plug $h$, the cutters may be adjusted to positions exactly equi-distant from the plane to the end that the sides of the nut or bolt head, after being milled, shall be equi-distant from the axis of the nut or bolt.

The shaft $f$ is operated by means of a hand wheel $i$ and miter gears $k$ $k$, in a manner that is common.

The saddles H are each usually formed with a rigid horizontal lip $k^5$ at its rear edge, Figs. 5 and 14, turned into a corresponding recess in the sliding block for the purpose of overcoming the tendency of the cutters to lift the saddles when acting upon a nut or a bolt head.

The sliding blocks I are formed with dovetail bearings $e$ $e$, upon the standards K, Figs. 1, 6 and 14, at right angles with the cutter shafts, which admit of the latter being moved horizontally toward or from the spindle carrier. These sliding blocks are moved upon the standards by means of racks $m$ $m$ at their under sides Figs. 5 and 6, which are engaged by gears $n$ $n$ carried by a horizontal shaft $o$ resting in bearings in the standards. A hand lever $p$, (see also Fig. 1,) rigid with the shaft enables the attendant to turn the latter and move the sliding blocks at will.

The cutters are preferably formed with tapered axial shanks or stems inserted in the ends of the cutter shafts in a manner that is common so that they may be removed from the respective shafts.

The cutter shafts are driven by belts $r$ $r$ on the pulleys G G.

*Means for driving the spindle carrier.*— The spindle carrier is formed with a hub W, Fig. 40, at one side in which is rigidly inserted a short axial shaft X. To this shaft is rigidly secured a worm gear U, shown also in Figs. 6, 8 and 14. The gear U is operated by a worm $d$, shown also in Fig. 1, carried by a horizontal feed shaft $s$ resting in a yoke Y at one side of the spindle carrier. This yoke is secured to a standard $t$, Figs. 1, 6, 7 and 8, rising from a bearing N of the spindle carrier, the axis of the shaft being in a vertical plane at right angles with the axis of the spindle carrier. At its forward end the shaft is provided with a loose belt pulley R, Figs. 1, 6 and 14, formed with clutch teeth $u$ clearly shown in Fig. 11. Opposite the teeth $u$ upon the shaft is a longitudinally sliding clutch $v$ held to turn with the shaft by a spline $w$.

The clutch is kept normally in engagement with the teeth of the pulley R by means of a spring-pressed buffing plate $x$ resting against a shoulder of the shaft. This plate is provided with studs $y$, Fig. 13, pressing against springs $z$, Fig. 12, in longitudinal cavities in the clutch. When the clutch engages the teeth of the pulley R it will be understood that the latter from the action of the belt $u'$ turns the worm $d$ and consequently the spindle carrier. The clutch is temporarily thrown out of action at intervals by means of a bent lever $b'$, Figs. 1, 6, 8 and 14, fulcrumed at $a'$ upon a horizontal ledge $c'$ forming a part of the yoke Y. This lever is adapted to operate a fork $d'$ entering a groove in the clutch, shown in Figs. 9 and 10. The fork is fitted to slide longitudinally in horizontal bearings in the yoke, over the feed shaft. The contiguous end of the lever, passing across the fork, is confined between vertical pins $e'$, as shown, rigid in the fork.

Upon the shaft X is rigidly secured a disk Z, Figs. 1, 6, 8, 14 and 40, provided with a series of adjustable peripheral dogs $f'$, more fully shown in Figs. 15 and 17, adapted to encounter a downwardly projecting stud $g'$ in the outer end of the lever $b'$. The disk turns with the spindle carrier and as it moves around the inclined parts of the dogs successively encounters the lever and temporarily throws it to the position shown by full lines in the figures. Moving the lever to this position throws the clutch back from the driving pulley R, against the action of the buffer, and causes the pulley to become an idler and for a time lose control of the feed shaft. As soon as a dog passes the lever the springs $z$ throw the clutch into engagement with the pulley and the latter then turns the shaft and the spindle carrier until again thrown out of action.

The disk Z is preferably formed with a circular groove $i'$ near its periphery, as shown in Figs. 14 and 17. In this groove are fitted gibs $k'$, Figs. 18, with indentations in their sides to receive the points of binding screws $l'$ which pass through the dogs to hold the latter in place.

The action of a dog upon the lever will be fully understood by viewing Fig. 15. The inclined part of the dog serves to throw the stud from the position shown by the full-line circle to the position shown by the dotted circle. The full-line circle shows the position of the stud when the clutch is thrown against the wheel, in which case the lever occupies the position shown in dotted lines in Fig. 1. The dotted circle corresponds with the full-line position of the lever in Fig. 1.

It will be observed that there are shown four radial spindles P equally spaced around the spindle carrier, each carrying a nut $h'$ (or bolt) to be milled. When two sides of a nut or bolt head are milled in any given case the rapidly revolving pulley R, being brought into action, turns the spindle carrier and quickly brings the next spindle with its nut or bolt to the cutters. This act of rapidly moving the spindle carrier at intervals is the only function of the pulley and its co-acting parts above described.

*The feed mechanism.*—Upon the rear end of the feed shaft $s$—opposite the pulley R—is fitted to turn freely a feed step pulley S, Figs. 1, 6, 7 and 14, which at intervals is caused to turn the feed shaft and consequently the spindle carrier. The actions of this step pulley upon the feed shaft are alternated with those of the pulley R, these pulleys together serving to turn the spindle carrier in the same direction, and continuously. The step pulley, from the action of the belt $m'$, turns the spindle carrier very slowly, as with a feed motion, while the cutters are acting upon a bolt or a nut.

The belt $m'$, is enabled to slowly turn the spindle carrier by the following means: $n'$, Figs. 1, 7 and 14, is a ratchet loose on the feed shaft provided with a detent pawl $o'$ held by the yoke Y. Between the ratchet and the pulley S are two contiguous gears $p'$ $r'$, the former being rigid with the ratchet and the latter—next the step pulley—being rigid with the shaft. These gears are of the same diameter, but differential, $r'$ having seventy-one teeth while $p'$ has only seventy teeth. The step pulley is provided with a toothed planet wheel $s'$, turning freely on a rigid stud $t'$, in position to engage the teeth of both gears $p'$ $r'$, the thickness of the planet wheel being equal to that of both of said gears. Now it will be understood that, on account of the difference in the numbers of the teeth of the gears, when the wheel $s'$ rolls around the gears the latter will have a slight relative motion upon each other, this motion amounting to one tooth of the gear $r'$, to each complete revolution of the planet wheel around the gears. And as the pawl $o'$ serves to hold the gear $p'$ from turning backward the latter becomes the base of operation, on account of which the gear $r'$ must turn slowly in the direction in which the pulley S turns and so cause the spindle carrier to turn forward in its bearings. The pulleys S and R continually rotate, and the differential gears $p'$ and $r'$ and the planet wheel do not stop even while the pulley R is in control of the feed shaft. But there is, on account of this, no clashing of the different parts and mechanisms for while the pulley S is active the pulley R is idle, and while the latter is in control of the shaft it turns the latter more rapidly than the pulley S would turn it on account of which the ratchet wheel turns away from the pawl and the latter is rendered temporarily idle and effects nothing. The moment the clutch releases the wheel R the ratchet tends to reverse its direction of motion but being instantly arrested by the pawl the feed shaft continues its motion forward but at a slow rate, as stated.

The operations of the machine thus far described are as follows: The clutch being normally in engagement with the pulley R the latter brings a spindle with a nut $h'$ down to the cutters but so as not to quite touch them. At this point the clutch is thrown out and the pulley S takes control of the feed shaft and the spindle carrier and slowly turns the latter onward in the same direction until the nut has passed the cutters. Now the clutch is again brought into action causing the pulley R to bring the next spindle down to the cutters. The clutch is then again thrown out and the spindle carrier given over to the control of the feed mechanism. These operations are repeated in the order named as long as the machine is running.

It will be seen from this description that the continuous forward motion of the spindle carrier is not uniform but that its motion is made up of periods of slow and of rapid rates alternated. And, further, that in a complete revolution of the spindle carrier there are a definite number of periods of slow rate and rapid rate, and that the number of the periods of slow rate corresponds with the number of the spindles, the latter passing the cutters during said periods of slow rate. The number of the periods of slow and of rapid rates in each revolution of the spindle carrier is regulated by the number of the dogs $f'$ on the disk Z, there being as many dogs placed on the disk as there are spindles in the spindle carrier. Should there be more or less spindles than four there would be correspondingly more or less than four dogs on the disk.

It will be seen by viewing Fig. 15 that the operating part of a dog $f'$ terminates abruptly, leaving the clutch-operating lever to itself, the only function of the dog being to disengage the clutch. To hold the latter back while the cutters are operating, a catch lever $v'$, Figs. 1, 6, 8, 9, 10 and 14, is provided, fulcrumed at $w'$ on the yoke Y, in position to catch a short bar $x'$ rigid with the fork $d'$, as shown. The long end of this lever curves downward near to and parallel with the disk Z in position to be acted upon by another series of adjustable dogs, $y'$, on the disk, see Fig. 16. These dogs are each provided with a projecting pin $z'$ in position to successively encounter the lever as the disk revolves. The numbers of the dogs $f'$ and $y'$ on the disk are equal. The dogs $f'$ are set to throw the clutch out just as a nut is brought to the cutters, while the dogs $y'$ are set to trip the catch lever and throw the clutch into action immediately after the cutters cease action upon the nut. The relative positions of the respective dogs $f'$ and the dogs $y'$ following them, are determined from the size of the nuts to be milled, the intervals between the pairs of co-acting dogs determining the length of the periods of slow motion of the spindle carrier.

The dogs $y'$ are secured to the disk Z in a manner similar to that in which the dogs $f'$ are secured thereto, all the dogs being movable upon the disk.

*The indexing mechanism.*—Four radial equally spaced spindles are shown for holding the bolts or nuts to be milled but the number of spindles is not essential to our invention, four being a convenient number.

When the spindle carrier has made a complete revolution and two opposite sides of each of the bolt heads or nuts carried by the spindles have been milled the spindles need to be turned upon their axes, or indexed, to present other sides of the bolt heads or nuts to the cutters.

As shown in Figs. 39 and 40 each spindle is held in place by means of a holding ring $a^2$ threaded in a cavity in the spindle carrier, flush with the surface of the latter, in which ring the spindle freely turns. Immediately beneath the holding ring is a second ring $b^2$ threaded upon the spindle and bearing against the under surface of the holding ring, acting in the capacity of a jam nut. The spindles, which are hollow cylinders, are each provided at its inner end with a rigid bevel pinion $c^2$, these pinions being uniform. A bevel gear $d^2$, held by an axial shaft $e^2$, is placed in a cavity in the side of the spindle carrier in position to engage the pinions $c^2$, as shown. This gear turns with the shaft but is adapted to move through a short distance longitudinally thereon.

The shaft $e^2$ has its bearing in the hub of a circular plate A', see also Figs. 1, 6, 21, 22, and 31, said plate being provided with a circular flange $f^2$ bolted rigidly to the side of the spindle carrier and concentric therewith. Within the hub and upon the shaft is placed concentrically a circular follower $g^2$ in position to bear against the back of the gear. This follower is adapted to move longitudinally upon the shaft and is pressed against the gear by simple longitudinal threaded pins $h^2$, three or more in number, embedded in the plate, as shown. By means of this follower and the rings $b^2$ any wear that may occur between the teeth of the gear and pinions may be compensated for and lost motion taken up. This is necessary from the fact that the movements of the spindles in the matter of indexing need to be very accurate.

The shaft $e^2$ overhangs the plate A', as shown in Fig. 31, upon which overhanging part is placed a worm gear B', shown also in Figs. 6, 21 and 22. This worm gear is preferably secured rigidly with the shaft by means of jam nuts or collars $i^2$, as shown.

The worm gear B' and the shaft $e^2$ are turned by the following means: E', Figs. 1, 6, 21, 22, 23 and 24 is a hanger bolted rigidly to the plate A', which holds a shaft $m^2$ to which is secured a worm F' in position to engage the gear, the axis of the shaft $m^2$ being in a plane at right-angles with the axis of the shaft $e^2$. This hanger also holds another shaft $n^2$ at right angles with the shaft $m^2$, the axes of these shafts being in a plane. To the adjacent ends of the two shafts $m^2$ $n^2$ are secured miter gears $o^2$ $o^2$ engaging each other, the gears being preferably screw-threaded onto the respective shafts.

A radial link H' is rigidly secured to the extreme overhanging end of the hanger, parallel with the plate A', having its lower end pierced by the shaft $e^2$, see Fig. 31. The shaft constitutes a rest for that part of the link and it has practically a journal bearing in the link, it at times being caused to turn therein.

The outer end of the shaft $n^2$ overhangs the link, to which overhanging end is secured a removable spur pinion $p^2$ adapted to be turned by a driving gear G' by means of an intermediate gear $r^2$ held upon a shiftable stud secured to the link. A loose spacing washer of common kind between the pinion and the link, and a simple nut on the extreme end of the shaft $n^2$ outside of the pinion, serve to hold the latter in place.

Secured rigidly to the plate A' near the hanger E' is a circular horizontal concentric standard or carrier C', Figs. 1, 21, 22 and 31, formed with a circular concentric hub $k^2$ near its outer end. This hub is hollow and holds within it an axial shaft $l^2$ the axes of which shaft, the shaft $e^2$ and the shaft X being in a straight line. A branched standard D', more fully shown in Fig. 6, bolted rigidly to the bed plate A holds in two upwardly-extended branches respectively the outer end of the shaft $l^2$ and the hub $k^2$ of the carrier C'. The shaft extends inwardly beyond the hub of the carrier, as shown in Fig. 31, the driving gear G' being made rigid with said shaft on the inside of the carrier. For the purpose of centering the shafts $e^2$ and $l^2$ and to give them practically a mutual journal bearing, the former is made hollow at its end to receive the reduced end of the latter, as shown. By means of this construction, also, the overhanging end of the shaft $e^2$ has the benefit of the bearing of the shaft $l^2$ in the hub $k^2$.

From the above description it will be understood that whenever the shaft $l^2$ is turned in its bearings the gearing connecting said shaft and the shaft $e^2$ (including the parts G', $r^2$, $p^2$, $o^2$, $o^2$, F' and B') will be put in motion together with the latter shaft and the spindles P.

The shaft $l^2$ is operated and controlled as follows: The carrier C', Fig. 31 slightly overhangs its bearing in the standard D', which overhanging part is externally threaded (see Fig. 22) and formed with a collar. Upon this threaded part and against the collar is fitted a hollow drum I', Figs. 1, 6, 31, 32 and 34 consisting in part of a removable ring $s^2$ having the same external and internal diameters as the other part of the drum. The two parts of the drum are preferably joined by a simple peripheral recess $v^2$ formed in one and a corresponding tongue $w^2$ on the other which serve to center them, the parts being held together by bolts $x^2$. The drum thus constructed has one open side.

Upon the shaft $l^2$ and adjacent to the drum is placed an inner friction disk $t^2$ in position to slightly enter and close the open side of the drum, the external diameter of the disk being equal to the internal diameter of the drum. Upon the shaft is also fitted an outer friction disk $u^2$ co-acting with the inner friction disk, between which is placed a friction belt pulley T. This belt pulley is held upon an inwardly-turned hub $z^2$ of the inner friction disk, upon which it is adapted to turn as with a journal bearing. The disks are caused to turn with the shaft by means of a spline $y^2$ but are permitted to move longitudinally thereon through short distances.

The pulley T is formed with an outer flange $a^3$, the disk $t^2$ constituting an inner flange for the pulley, said parts $a^3$ and $t^2$ being equal in diameter.

Friction rings $b^3$, preferably of leather, are inserted between the pulley T and the adjacent surfaces of the friction disks, as shown in Fig. 31. These rings are preferably secured to one or the other of the contiguous bodies as is most convenient, but this is not essential. While the pulley, which is continuously rotated by an ordinary belt, is not pressed between the friction disks it is simply an idler and effects nothing; but when pressed between the disks the latter are turned by it and consequently the shaft $l^2$, and the whole indexing mechanism are put in motion. When the pulley is idle the shaft $l^2$ and the entire indexing mechanism are also idle, the parts except the pulley simply moving with the spindle carrier without effecting anything. To operate these friction devices we employ a tongue $c^3$, Figs. 31 and 32, upon the shaft $l^2$ adapted to slide longitudinally in bearings in the drum I'. The tongue rests diametrically in the drum and it is adapted to slide in directions at right-angles with the shaft, it being formed with an oblong opening $d^3$ around the shaft to admit of this motion. The tongue is formed with a slight rectangular depression $e^3$ in one side, adjacent to the shaft, in which is closely fitted a wedge $f^3$, Fig. 37, having an oblong opening $g^3$ corresponding with the opening in the tongue.

Contiguous to the wedge is an inclined block $h^3$, Fig. 36, formed with a central opening $i^3$ to freely fit the shaft, the inclined surfaces of the wedge and the block being together. The contiguous faces of the block and the wedge are tongued and grooved, as shown in Fig. 38, to the end that they shall not turn upon each other, and as the block must be slipped onto the end of the shaft provided with the spline, the opposite end being provided with a pinion, it is necessary to provide the block $h^3$ with a key way entering the aperture for the shaft, as shown in Fig. 36.

A stem $k^3$, Figs. 31 and 32, rigid in the drum enters the inner end of the tongue, upon which stem is placed a spiral spring $l^3$ which keeps the tongue normally in the relative position shown by full lines in said figures. The stem corresponds with the axis of the tongue, and the cavity in the latter to receive the stem is sufficiently deep to admit of the tongue moving toward the stem, as indicated by dotted lines in Fig. 32.

The outer end of the tongue normally projects beyond the periphery of the drum and is made inclined as shown. Now it will be understood, viewing Fig. 31, that if the tongue be pushed inward at any time the block $h^3$ will be forced by the wedge against the friction disk $t^2$. This will press the friction rings $b^3$ against the pulley whereupon the disks, the shaft $l^2$ and the driving gear G' will be turned by the pulley.

The circular plate A', the carrier C' and the drum I' being rigidly connected with the spindle carrier always turn with the latter. And, normally, the entire indexing mechanism except the belt pulley T also turns with the spindle carrier, said mechanism being temporarily given over to the control of the pulley T only when it is necessary to index the work. The friction disk $t^2$ is free to move within the open side of the drum either longitudinally upon the shaft $l^2$ or when turning with the latter with a speed different from that of the drum. The tongue is forced inward at each revolution of the drum and the spindle carrier by its projecting inclined end coming in contact with a stud $m^3$, Figs. 6 and 30, held by the standard D'. This stud is made longitudinally adjustable by being threaded in the standard, and a jam nut $n^3$ serves to hold it rigidly in position.

The operations of the parts are so timed that the indexing of the work takes place during one of the periods of rapid motion of the spindle carrier and while the pulley R is driving the feed shaft, as hereinbefore explained. That is to say, the operation of indexing begins after the cutters have ceased to act upon a nut in any given case and finishes before the cutters commence to act upon the next succeeding nut.

In indexing the spindles it is necessary to turn them through a fourth, sixth, eighth, &c., of a revolution according to the form of the nut or bolt head being milled. But the machine is so constructed that the time or period during which the indexing mechanism is in motion is the same in all cases: means hereinafter described being provided to vary the motion of the spindles according to the work.

The tongue is provided with a short rigid cross stud $o^3$, Figs. 31 and 32, projecting at both sides thereof which, normally, (on account of the action of the spring $l^3$,) presses against the inner periphery of the drum. A gear $p^3$, Fig. 33, is pivoted eccentrically within the drum at one side of and contiguous with the tongue, adapted to turn upon a stud $r^3$ rigid in the side of the drum. The shaft $l^2$ is formed with a pinion $s^3$ the teeth of which being in position to engage the teeth of the gear. This gear is formed with an annular recess $t^3$, next the tongue, having a peripheral opening or outlet $u^3$. Normally one end of the cross stud $o^3$ occupies the opening $u^3$, as indicated by dotted lines in Fig. 33; but when the tongue is pushed inward by the stud $m^3$ the cross stud comes opposite, or within the radius of, the recess $t^3$. But the instant the tongue is depressed the shaft $l^3$ begins to turn and revolve the gear $p^3$, which serves to confine the cross stud within the recess $t^3$ and temporarily hold the tongue back against the spring $l^3$.

The inner face of the friction disk $t^2$ is contiguous with the tongue and formed with a peripheral flange in which is an opening $w^3$, Fig. 35, the tongue being between the disk and the gear $p^3$. And when one end of the cross stud occupies the opening $u^3$ in the gear its opposite end occupies the opening $w^3$. The disk is further formed with a concentric circular recess $v^3$, within the flange, Figs. 31 and 35, opposite the recess $t^3$ in the gear. The periphery of the friction disk and the points of the teeth of the gear farthest from the shaft $l^2$ are equi-distant from the shaft, as appears in Figs. 31, 32 and 35. Also the outer wall of the recess $v^3$ and the outer wall of the recess $t^3$ farthest from the shaft are equi-distant from the latter. This causes said two recesses to register or co-incide at points adjacent to the cross stud on account of which the latter occupies both recesses simultaneously so that both share in confining the cross stud and holding the tongue temporarily back for the purpose of setting the indexing mechanism in motion.

As constructed there are twelve teeth in the pinion $s^3$ and forty-eight teeth in the gear $p^3$ on account of which the former makes four revolutions to one of the latter. But the tongue is confined during a complete revolution of the gear hence the friction is held in action and the indexing mechanism operates during the time of four revolutions of the shaft, and the pulley T. This period may amount to one-eighth, more or less, of the time of a single revolution of the drum I' and the spindle carrier.

When the indexing mechanism is in motion and the gear $p^3$ and disk $t^2$ are revolving they turn in opposite directions, the opening $w^3$ in the latter passing the contiguous face of the gear several times. But when the openings $w^3$ and $u^3$ present themselves simultaneously to the cross stud the tongue escapes and relieves the friction whereupon the indexing mechanism instantly stops. The spindles then remain relatively at rest in the spindle carrier until all have passed the cutters once, when they are again indexed.

A circular movable relief plate $x^3$, Figs. 2, 4 and 31, is placed upon the shaft $l^2$ between the friction disks $t^2 u^2$. This plate is provided with rigid longitudinal studs $y^3$ which enter cavities in the disk $u^2$ and encounter springs $z^3$, shown also in Fig. 3, which serve to force the disks apart and relieve the friction. The disk $u^2$ is adapted to slide longitudinally upon the shaft $l^2$ and it is held to place by a nut $a^4$, Figs. 1, 6, and 31, threaded upon the shaft, bearing against its outer surface. As a matter of convenience this nut is split, the parts being held together by transverse bolts in the ordinary manner. This nut enables the attendant to move the disk toward or from the pulley T so as to regulate the pressure upon the friction rings.

Nuts and bolt heads having different forms require to be differently indexed, the spindles being turned through one-fourth of a revolution for square forms, for instance, and one-eighth of a revolution for octagonal forms. But, as has been already stated, the indexing mechanism moves alike in all cases. To regulate the distance through which the spindles turn for different kinds of indexing, the gear $p^2$, Fig. 21, is changed, the intermediate gear $r^2$ being brought into mesh therewith. That is to say a small gear is put into the place of the gear $p^2$ on the shaft $n^2$ for indexing square forms, a larger one for indexing hexagonal forms and a still larger one for indexing octagonal forms.

The link H' is of common kind, formed with a circular slot $d^5$, Fig. 23, concentric with the gear G', in which to adjust the stud $e^5$, Fig. 21, holding the intermediate gear $r^2$.

It will be understood that bolt heads or nuts having forms corresponding with any polygon having an equal number of sides may be milled in this machine by placing a gear having the right number of teeth on the shaft $n^2$ in the place of the gear $p^2$.

The indexing mechanism above described is independent of the mechanism for turning the spindle carrier in its bearings, said two mechanisms being on opposite sides of the spindle carrier.

*The spindle clamping mechanism.*—While the cutters are acting upon a nut or bolt head it is necessary that the spindle holding it should accurately maintain its position in the spindle carrier to the end that the milled surfaces be true and smooth. To accomplish this we provide binders for the spindles which operate to firmly hold each from turning while the cutters are acting.

As shown in Fig. 19, $b^4$ is a threaded bolt extending through the spindle carrier L from side to side in a direction at right-angles with the axis of the spindle, the axis of said bolt being parallel with the axis of the spindle carrier. The bolt just clears the spindle and is threaded into a cylindrical binding head $c^4$ adapted to move longitudinally in a cavity in the spindle carrier. This binding head is cut away at one side to fit the convex surface of the spindle—see Fig. 20,—and is formed with cylindrical cavities $d^4$ in which are placed spiral springs $e^4$ which bear against the body of the spindle carrier at the bottom of the cavity occupied by the head, as shown in Fig. 20½. These springs serve normally to press the head back from the spindle to leave the latter free to turn in its bearing in the spindle carrier in the act of indexing.

The bolt $b^4$ is formed with a rigid collar $f^4$ at one side of the spindle carrier outside of which is placed, upon the bolt, a rocker $g^4$, see Figs. 1, 6 and 39, made rigid therewith by a binding nut $h^4$. The rocker is formed with two arms forming substantially a right angle projecting outward from the bolt in a plane parallel with the plane of the spindle carrier. Now by turning the rocker one way or the other the bolt will draw the binding head against the spindle or release it therefrom as the case may be.

L′, Figs. 1, 39, and 40, is an angle plate made rigid with a horizontally-extended part N′ of a standard K, provided with rigid horizontal studs $i^4$ in positions to encounter and turn the arms of the rocker as they pass. By observing Fig. 39 it will be seen that when a spindle carrying a nut is approaching the cutter $c$ the left-hand arm of the rocker will encounter the upper left-hand stud of the angle plate. This will cause the bolt to turn in the direction indicated by arrow $k^4$, which corresponds to the direction indicated by the full-line arrow in Fig. 19. This motion of the bolt serves to draw the binding head firmly against the spindle and hold the latter temporarily rigidly in place. As the rocker passes on, carried by the spindle carrier, its right-hand arm will encounter the lower right-hand stud $i^4$ and turn the rocker in a contrary direction, indicated by arrow $l^4$. This direction corresponds to the direction indicated by the dotted-line arrow in Fig. 19, which motion of the rocker and bolt causes the binding head to move back and release the spindle.

Each spindle is provided with a similar binding mechanism which is placed in advance of the spindle reference being had to the direction of motion of the spindle carrier. And when the latter, turned by the pulley R, causes a spindle to occupy the position indicated by dotted lines at O′, Fig. 39, for example, the associated rocker will occupy the position shown at P′, its left arm being then just in contact with the upper stud $i^4$ of the angle plate. As the spindle advances to the position shown by full lines, with a nut just at the edge of the cutters, the rocker will be turned to the position indicated in full lines at R′ in which the spindle will be firmly held in place, as above described. The rocker remains in this position until the spindle reaches the position indicated by dotted lines at S′,—the nut having then passed the cutters—when the right arm of the rocker will encounter the lower stud of the angle plate, as indicated by dotted lines at T′, and be turned to the position indicated by dotted lines at K′. This releases the spindle. These operations take place every time a spindle passes the cutters.

*Means for holding the bolts and nuts.*— The nuts are held by mandrels $m^4$, Figs. 40, 41 and 42, inserted in the spindles and projecting beyond the ends thereof. Each mandrel is formed with a collar $n^4$ contiguous with the outer end of the spindle, and is held to place by a set screw $o^4$ passing through the side of the spindle. The mandrel is preferably formed with a circumferential groove $p^4$ in which is fitted a circular gib $r^4$ to receive the thrust of the set screw. The mandrel is threaded at its outer end, as shown, to receive the nut, the latter being turned snugly against a shoulder of the mandrel.

To hold bolts removable chucks shown in Figs. 25 to 29 are employed, threaded onto the ends of the respective spindles, as appears in Fig. 26. Each chuck is composed of a hollow cylindrical part or body U′ formed with hollow radial arms $s^4$ in which to insert a lever $t^4$ for turning it. Centrally within the chuck are three equal longitudinal jaws $u^4$ adapted to bear directly upon the body of the bolt, as shown. The ends of these jaws are conical and they are held by overlapping concentric rings $v^4$ $w^4$ formed with conical internal surfaces to meet the conical ends of the jaws.

The rings are formed upon their exterior surfaces with screw threads, as shown in Fig. 27, which fit interior threaded surfaces of the body U′. The thread upon the main ring $w^4$ is coarser than that upon the minor ring $v^4$ so that when the body U′ is turned upon them they will move relatively in longitudinal directions due to the difference of the leads of the threads. Now by turning the body in the direction indicated by arrow $x^4$ in Fig. 25, the ring $v^4$ will be drawn toward the main ring $w^4$, which is threaded onto the spindle P, and so firmly press the jaws upon the body of the bolt $y^4$ inserted within them. A contrary motion of the body will release the bolt, the jaws being forced apart by a cylindrical spring $z^4$ resting in internal cavities $a^5$ in the jaws. The rings $w^4$ and $v^4$ telescope upon each other which accurately centers them and the jaws, and which insures the milled heads of the bolts to be truly central with the bodies of the bolts.

To prevent the rings turning relatively with each other when the body U′ is turned upon them a longitudinal lining pin $b^5$ is employed resting in cavities in each. This pin, which is rigid in the ring $v^4$ and free to move in the other ring, causes the former ring to always move truly longitudinally within the body.

A spanner wrench is generally used to turn the ring $w^4$ onto and off of the spindle and also to turn the ring $v^4$ into the body U' in relatively adjusting the rings before the lining pin is inserted.

The axis of the jaws of each chuck coincides with the axis of the bore of the contiguous spindle, the bore being purposely made deep so as to receive a bolt of considerable length.

Safety bands or protectors $c^5$, shown in Fig. 39 and other figures, are turned upon the threaded parts of the spindles when the chucks are not in use, for the purpose of protecting the threads.

In operating this machine the attendant is stationed at V', Figs. 1 and 14, to supply it with bolts or nuts to be milled, and to remove them as fast as finished. The finished pieces are removed and replaced by others during the slow motions of the spindle carrier. In supplying bolts the attendant is careful to place them in the chucks so that two sides of the heads shall be vertical. Also in supplying nuts to the mandrels each is first turned firmly upon a mandrel and then the latter is turned in the spindle to bring two opposite sides of the nut into vertical positions, the set screw $o^4$ being first loosened for the purpose.

Friction heads or steadying devices $i^5$, Figs. 1 and 14, are provided for the spindle carrier, which overcome any tendency of the latter to jump and cause the cutters to chatter while operating. These friction heads are held to bear on opposite sides of the spindle carrier near its periphery and are threaded horizontally in rests $l^5$ rigid with the respective standards K K. Ordinary jam nuts are provided to hold these devices securely in place. The bearing surfaces of these friction heads are made of brass or similar soft metal; and they are turned against the spindle carrier sufficiently firmly to cause moderate friction therewith and prevent any back lash or trembling when the cutters strike into the work.

With this machine we use a small rotary pump V of common construction, Figs. 1, 6, and 14, driven by a belt $f^5$ on a pulley $g^5$ rigid with an extended part of a cutter shaft F. This pump draws oil from the reservoir B and delivers it upon the cutters $c$ through a pipe or conductor $h^5$, shown mainly by dotted lines.

What we claim as our invention is—

1. In combination, a spindle carrier, spindles held thereby, milling mechanism adjacent to the spindles of the carrier, and means for turning the carrier with unequal velocities through parts of a single revolution, substantially as set forth.

2. In combination, a spindle carrier, spindles held by said spindle carrier, rotary cutter shafts adjacent to the periphery of the spindle carrier, cutters on said shafts, and means to turn the spindle carrier with unequal velocities through parts of a single revolution, substantially as described.

3. In a nut milling machine a spindle carrier and spindles therein, in combination with rotary cutters co-acting with the spindles, and means to turn the spindle carrier through parts of each of its revolutions at two different rates of speed the intervals of slow rate being alternated with the intervals of rapid rate, substantially as and for the purpose specified.

4. In a nut milling machine a spindle carrier and radial spindles therein projecting beyond the periphery of the spindle carrier, in combination with rotary cutters adjacent to the periphery of the spindle carrier, and means to turn the latter through parts of each of its revolutions at different rates of speed the intervals of slow rate being alternated with the intervals of rapid rate, the spindles being caused to pass the cutters during the intervals of slow rate, substantially as shown and described.

5. In a nut milling machine a spindle carrier and radial spindles therein, in combination with rotary cutters co-acting with said spindles, and means to turn the spindle carrier through parts of each of its revolutions at different rates of speed the intervals of slow rate being alternated with the intervals of rapid rate, and the number of intervals of slow rate in a single revolution of the spindle carrier being equal to the number of spindles, substantially as set forth.

6. A spindle carrier of a nut milling machine and spindles held in the carrier, in combination with rotary cutters co-acting with the spindles, and means to turn the spindle carrier through parts of each of its revolutions at different rates of speed the intervals of slow rate being alternated with the intervals of rapid rate, and means to control the length of the intervals of slow rate, substantially as and for the purpose specified.

7. In a nut milling machine a spindle carrier and radial spindles therein, in combination with rotary cutters co-acting with the spindles, and means to turn the spindle carrier at different rates of speed during parts of a single revolution, the spindle carrier turning continually in the same direction, substantially as set forth.

8. In a nut milling machine a rotatory spindle carrier and a worm gear turning therewith, in combination with a feed shaft, a worm on the feed shaft to engage the worm gear, two loose pulleys on the feed shaft, mechanisms connecting said pulleys respectively with the shaft, and means to bring said mechanisms into action whereby either pulley may turn the shaft, substantially as described.

9. In a nut milling machine a rotatory spindle carrier and a worm gear turning therewith, in combination with a feed shaft, a worm on the feed shaft engaging the worm gear, two loose pulleys on said feed shaft and independent mechanisms connecting said shaft and the respective pulleys, and means to bring said mechanisms into action whereby the pulleys are caused to turn the shaft alternately, substantially as shown and described.

10. In a nut milling machine a spindle carrier and spindles therein, in combination with rotary cutters co-acting with the spindles, and means to turn the spindle carrier through parts of each of its revolutions at two different rates of speed the intervals of slow rate being alternated with the intervals of rapid rate, and means to turn said spindles in their bearings during an interval of rapid rate of the spindle carrier, substantially as specified.

11. A nut milling machine having a rotatory spindle carrier, radial spindles in the carrier, toothed pinions on the spindles, a gear engaging the pinions, and a shaft to turn the gear, in combination with a follower on the shaft adapted to press the gear, pressing pins to actuate the follower, and means to rotate the shaft, as and for the purpose stated.

12. In combination, a rotatory spindle carrier, rotatory spindles in the spindle carrier, rotary cutter shafts, cutters on said shafts adjacent to the periphery of the spindle carrier, and a clamp to hold the spindles rigid with the spindle carrier, substantially as and for the purpose specified.

13. In a nut milling machine a rotatory spindle carrier and radial spindles therein, in combination with a binding head for each of the spindles held by the spindle carrier, a bolt threaded in each of said binding heads and projecting beyond the side of the spindle carrier, and a rocker on each bolt rigid therewith, and an actuator for the rockers, as and for the purpose specified.

14. In a nut milling machine a rotatory spindle carrier, radial spindles in the spindle carrier and rotary cutters co-acting with the spindles, in combination with adjustable friction heads $i^5$ to press the spindle carrier, substantially as and for the purpose set forth.

15. In a nut milling machine a rotatory hollow drum, a toothed axial shaft in the drum, a gear pivoted eccentrically in the drum adapted to be turned by the shaft, a tongue in the drum adjacent to the gear and projecting beyond the periphery of the drum, a spring to actuate the tongue, a rigid cross stud in the tongue co-acting with the gear, a stud to encounter the projecting end of the tongue, and means to turn the shaft, substantially as set forth.

16. In a nut milling machine a rotatory hollow drum open at one side, a disk adapted to enter the open side of the drum, a toothed axial shaft piercing the drum and the disk, a gear pivoted eccentrically in the drum and adapted to be turned by the shaft, a spring-actuated tongue in the drum between the gear and the disk and projecting beyond the face of the drum, a rigid cross stud in the tongue adapted to engage the gear and the disk, a stud to move the tongue, and means to turn the shaft, substantially as set forth.

17. In a nut milling machine a rotatory hollow drum open at one side, a disk adapted to close said open side of the drum, having a concentric recess in its inner face, a toothed axial shaft passing through the drum and the disk, an eccentric gear in the drum formed with a concentric circular recess opposite the recess in the disk, adapted to be turned by the shaft, a tongue held diametrically in the drum between the gear and the disk and projecting beyond the face of the drum, a spring to actuate the tongue, a rigid cross stud in the tongue adapted to enter said recesses in the gear and the disk, means to press the tongue inward whereby said cross stud will enter said recesses in the gear and the disk, a belt pulley contiguous with the outer face of the disk concentric with the shaft, a second concentric disk on the shaft contiguous with the pulley opposite the first named disk, friction rings between said pulley and the respective disks, and means to press said rings between the respective disks and the pulley, substantially as shown and described.

18. In a nut milling machine, the combination, with a base, of standards thereon, the upper ends of which standards are each provided with ways, sliding blocks upon the standards, the upper surface of each of which is provided with ways at right angles to the lower ways, a saddle upon each block, a shaft journaled upon each saddle, the inner end of each of which is provided with a milling tool, and means for rotating the carrier and the shaft and for moving the saddles and blocks, substantially as set forth.

19. In a nut milling machine, the combination, with a spindle carrier, provided with spindles, milling mechanism adjacent to the periphery of the carrier, a feed shaft, two pulleys on said shaft, a clutch for engaging with one of the pulleys, and a differential mechanism for engaging the other one, substantially as set forth.

20. In a nut milling machine, the combination, with a rotary spindle carrier provided with projecting spindles, of a yoke, a feed shaft journaled therein, a pulley at each end of the shaft, one of which is provided with a clutch mechanism and the other one is provided with a pawl and ratchet mechanism for connecting the pulleys with the shaft, a lever for operating the clutch mechanism, and a wheel upon the axle of the spindle carrier provided with means for engaging with the lever at intervals, substantially as set forth.

21. In a nut milling machine, the combination, with a carrier provided with spindles, of a feed shaft for rotating the shaft, a pulley and clutch at one end of the feed shaft, and a pulley and gear at the other end, a lever and a catch for operating the clutch, a disk upon the axle of the carrier, and a series of dogs detachably and removably secured to the periphery of the disk for engaging with and operating the lever and the catch, substantially as set forth.

22. In a nut milling machine, the combination, with a spindle carrier provided with spindles, and means for rotating the spindles, a disk having its periphery provided with an annular groove, a series of dogs adjustably and removably secured therein, a gib for each dog having an indentation in its surface and a set screw for engaging with the gib and securing it at any place upon the periphery of the disk, substantially as set forth.

23. In a nut milling machine, the combination, with a spindle carrier provided with spindles, the inner end of each of which spindles is provided with a bevel pinion, a block secured to the side of the carrier, a shaft journaled therein, the inner end of which is provided with a bevel gear to engage with the pinions of the spindles, a follower upon the shaft in engagement with the rear face of the gear, and means for moving the follower to take up the wear between the gear and the pinions, substantially as set forth.

24. In a nut milling machine, the combination, with a spindle carrier provided with spindles, the inner end of each of said spindles being provided with a bevel pinion, a shaft journaled in a line with the axis of the carrier, the inner end of which is provided with a bevel gear in engagement with the pinions upon the spindles, a worm gear upon the outer end of the shaft, and means for intermittingly giving the shaft a greater or less partial rotation, whereby the articles being acted upon may be properly indexed or rotated, substantially as set forth.

25. In a nut milling machine, the combination, with a spindle carrier provided with spindles, the shaft journaled in the side of the carrier for rotating the spindles, a worm gear upon the shaft, a train of gear wheels for intermittingly rotating the worm gear, a portion of said wheels being interchangeable, whereby the amount of rotation of the shaft and spindles actuated thereby may be changed, substantially as set forth.

In witness whereof we have hereunto set our hands, this 5th day of February, 1894, in the presence of two subscribing witnesses.

JESSE H. BROWN.
HIRAM W. SMITH.

Witnesses:
ENOS B. WHITMORE,
M. L. WINSTON.